US008914527B2

United States Patent
Desai et al.

(10) Patent No.: US 8,914,527 B2
(45) Date of Patent: Dec. 16, 2014

(54) METHODS AND SYSTEMS FOR LOAD BALANCING USING FORECASTING AND OVERBOOKING TECHNIQUES

(75) Inventors: Nitin Desai, Coral Springs, FL (US); Steve Dillon, Deerfield Beach, FL (US); David Stone, Lauderdale By-the-Sea, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 751 days.

(21) Appl. No.: 12/827,610

(22) Filed: Jun. 30, 2010

(65) Prior Publication Data

US 2011/0078318 A1 Mar. 31, 2011

Related U.S. Application Data

(60) Provisional application No. 61/221,737, filed on Jun. 30, 2009.

(51) Int. Cl.
*G06F 15/16* (2006.01)
*G06F 9/50* (2006.01)
*H04L 29/08* (2006.01)

(52) U.S. Cl.
CPC .......... *G06F 9/5083* (2013.01); *H04L 67/1029* (2013.01); *H04L 67/1012* (2013.01); *H04L 67/1002* (2013.01); *H04L 67/1008* (2013.01); *H04L 67/1027* (2013.01); *H04L 67/1004* (2013.01)
USPC ............................ 709/229; 709/228; 709/227

(58) Field of Classification Search
CPC ............ H04L 67/1012; H04L 67/1008; H04L 67/1029; H04L 67/1027; H04L 67/1002; H04L 67/1004; H04L 29/08153; H04L 29/08243

USPC .......................................................... 709/228
See application file for complete search history.

(56) References Cited

U.S. PATENT DOCUMENTS

| 2002/0097724 | A1* | 7/2002 | Halme et al. | 370/392 |
|---|---|---|---|---|
| 2002/0138551 | A1* | 9/2002 | Erickson | 709/203 |
| 2003/0229697 | A1* | 12/2003 | Borella | 709/226 |
| 2004/0229630 | A1* | 11/2004 | Baccelli et al. | 455/453 |
| 2005/0198099 | A1* | 9/2005 | Motsinger et al. | 709/200 |
| 2008/0052719 | A1* | 2/2008 | Briscoe et al. | 718/104 |
| 2008/0127209 | A1* | 5/2008 | Gale et al. | 719/313 |
| 2009/0106571 | A1* | 4/2009 | Low et al. | 713/310 |
| 2009/0312983 | A1* | 12/2009 | Lee et al. | 702/180 |

* cited by examiner

*Primary Examiner* — Tom Y Chang
(74) *Attorney, Agent, or Firm* — Foley & Lardner LLP; Christopher J. McKenna; James M. White

(57) ABSTRACT

Methods and systems for establishing user sessions between a client and a server or server farm can be carried out by a load balancing agent executing on a computer in communication with the client, server or server farm. The load balancing agent can intercept a connection request generated by an application executing on a client and responsively select a server on which to establish a user session. Selecting the server can be based on overbooking a particular server and choosing a server with a predetermined amount of forecasted load. Forecasted load can be determined by summing the current load on a server with a current load calculated by multiplying: the average load on the user sessions hosted by the server; by the number of cached user sessions stored on the server; and by the probability that a cached user session reconnects.

18 Claims, 13 Drawing Sheets

METHODS AND SYSTEMS FOR LOAD BALANCING USING FORECASTING AND OVERBOOKING TECHNIQUES

RELATED APPLICATIONS

This Patent Application claims priority to U.S. Provisional Patent Application Ser. No. 61/221,737, filed on Jun. 30, 2009, the disclosure of which is considered part of the disclosure of this application and is herein incorporated by reference in its entirety.

FIELD OF THE DISCLOSURE

This disclosure relates generally to load balancing. More specifically, this disclosure relates to load balancing using forecasting and overbooking

BACKGROUND OF THE DISCLOSURE

Typically systems load balance by analyzing the current load on a system or machine and deciding where to place additional load based on the analysis. In systems that manage user sessions established between one or more servers and one or more clients where each user can access a user profile or account specific to that user, load balancing can be determined based in part on an analysis of the current load on each server. Load in this instance can comprise at least the amount of resources allocated to executing user sessions. When a user requests access to an application or otherwise initiates the creation of a user session, the system can responsively determine which server has the least amount of load, and then establish the user session on that server. Each time a user session is established, a number of computing resources are expended during the process of creating a user session and establishing a connection.

There exist systems that permit the reuse of user sessions by permitting users to reconnect to a previously established user session. These systems can respond to a user's request to initiate a user session by first determining whether there exists a previously established user session that can be re-established in lieu of initiating an entirely new session. In these systems, the chance that there exist multiple unused user sessions executing on a server at one time can be great. There is no guarantee that the user session will ever be re-established, therefore the user session could continue to use computing resources that could be used by an active user session. Thus, there exists a need to balance load in such a way that user session can be reused, but that also minimizes the number of unused, cached and inactive user sessions on a server.

SUMMARY OF THE DISCLOSURE

In its broadest interpretation, the methods and systems described herein describe embodiments of load balancing techniques that utilize overbooking and forecasting. Current load balancing models often do not take into account reusable user sessions that can be stored in cache when they are not in use. The methods and systems described herein address the need for load balancing modules that address the use of reusable user sessions by implementing load balancing techniques that advantageously utilize cached or otherwise stored user sessions while minimizing the number of unused, stored and inactive user sessions executing within a distributed computing environment.

In one aspect, described herein is are methods and systems for establishing a session between a first computer and an application executing on another computer. A load balancing agent executing on a first computer can intercept a connection request that is generated by the first computer to establish a session with an application. A determination can then be made as to whether the connection request corresponds to a cached session. In response to determining the connection request does not correspond to a cached session, the load balancing agent can identify a second computer that executes an instance of the requested application. This identification can be made by evaluating a forecasted load. In some instances, the forecasted load can be calculated by adding a current load value representative of a current load on the second computer to a load value for a distributed computing environment comprising the first computer and the second computer. Upon identifying the second computer, the first computer can be connected to the application executing on the second computer.

In one embodiment, determining the load value for the distributed computing environment can include identifying an average load on a plurality of sessions executing on the second computer, identifying a cached session value associated with an amount of cached sessions within the plurality of sessions, identifying a probability that a cached session reconnects, and multiplying the average load by the cached session value and the probability. In one embodiment, the plurality of sessions further comprises cached sessions and active session. In another embodiment, measuring the average load can include evaluating any of the following: a number of active sessions in the distributed computing environment; a number of cached sessions in the distributed computing environment; a number of computers in the distributed computing environment; and an average number of cached and active sessions hosted by each computer in the distributed computing environment.

In some embodiments, determining the current load value can include evaluating any of the following: a number of page faults; an amount of memory used by the second computer; an average amount of time the second computer uses a central processing unit of the second computer; and a number of sessions hosted by the second computer.

In still other embodiments, identifying the second computer can include determining a load on the second server is less than an amount of available second server resources, and determining the forecasted load is less than an amount of overbooked resources available to the second server. Identifying the second computer, in yet another embodiment, can include determining a load on the second server is less than an amount of available second server resources, and determining the forecasted load is greater than an amount of overbooked resources available to the second server.

In one embodiment, the methods and systems can include determining whether the forecasted load is greater than an amount of overbooked resources available to the second server, and stopping, based on a determination that the forecasted load is greater than the amount of overbooked resources, an oldest cached session on the second server.

In yet another embodiment, the methods and systems can include determining the connection request corresponds to a cached session, identifying, responsive to determining the connection request corresponds to a cached session, a third computer executing the cached session, determining whether a current load on the third computer is less than resources available to the third computer and connecting the first computer to the application executing on the third computer based on a determination the current load is less than the available resources. In some embodiments, the method can further include determining the current load is greater than the available resources, stopping execution of the cached session and instantiating a new session on another computer.

DETAILED DESCRIPTION OF THE DRAWINGS

The following figures depict certain illustrative embodiments of the methods and systems described herein. Each depicted embodiment is illustrative of the methods and systems and not limiting.

DETAILED DESCRIPTION

Figure 1A:
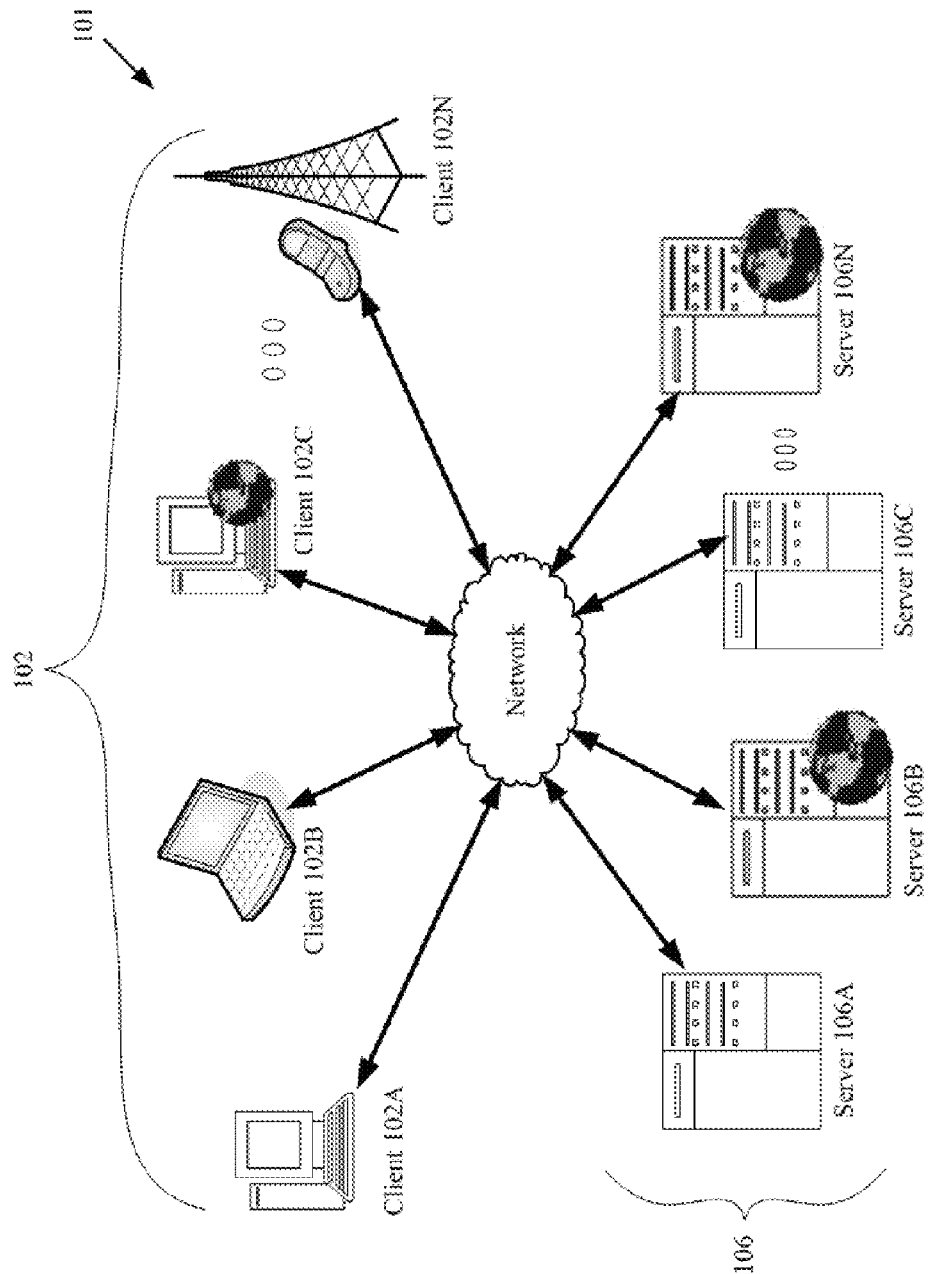
FIG. 1A is a block diagram illustrative of an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-102N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); client node(s); endpoint(s); endpoint node(s); or a second machine. The server 106 in some embodiments may be referenced by any one of the following terms: server(s), server farm(s), host computing device(s), or a first machine(s).

The client machine 102 can, in some embodiments, be a computing device. The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106*a*-106*n* in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
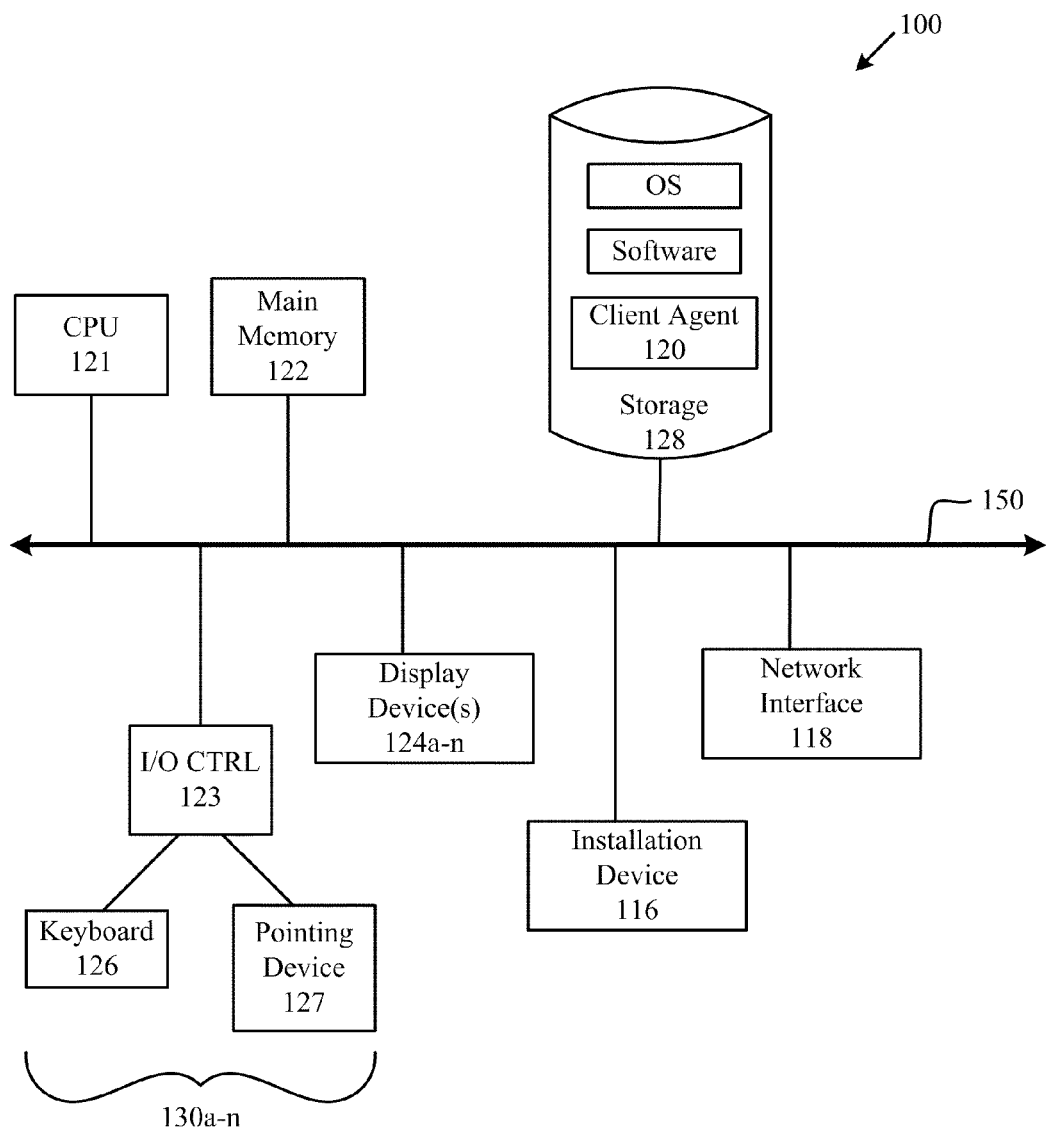
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
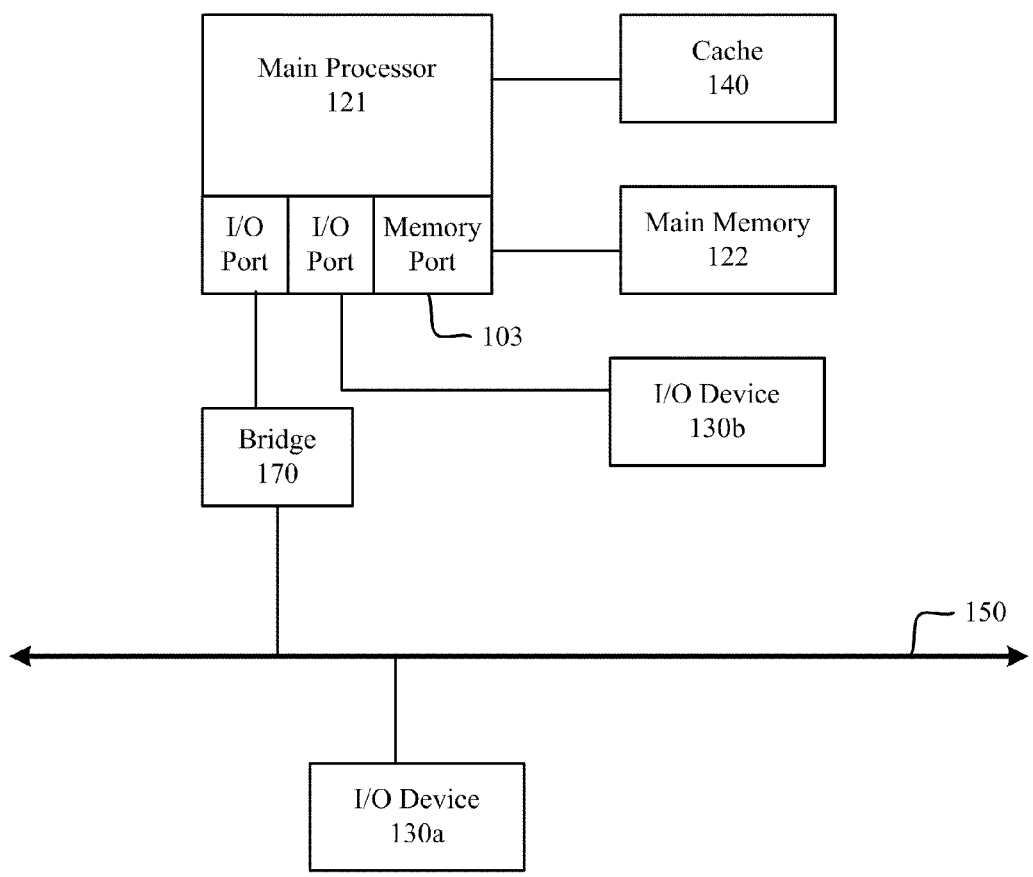

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus; while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 1D:
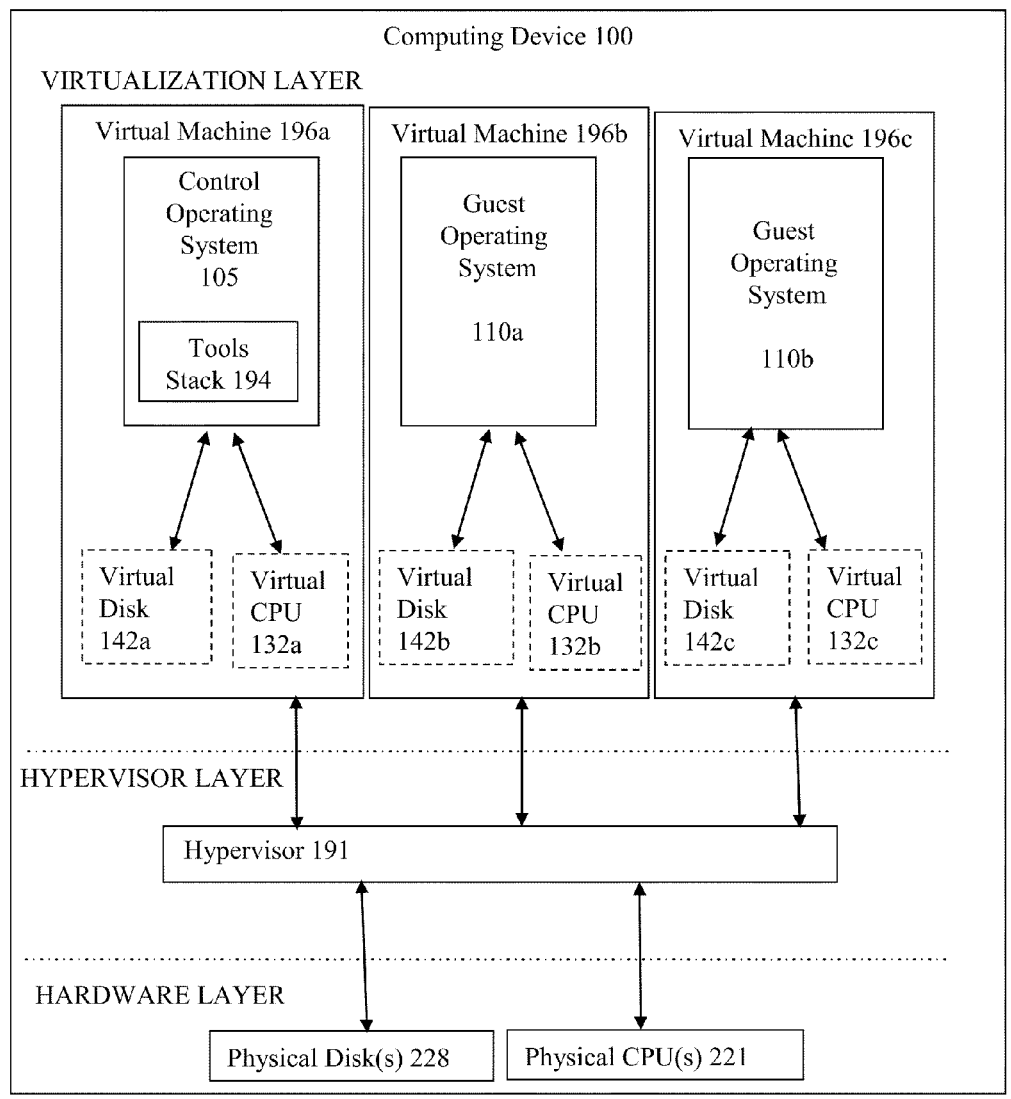
FIG. 1D is a block diagram illustrating an embodiment of a virtualization environment.

Illustrated in FIG. 1D is a block diagram depicting one embodiment of a virtualization environment. In brief overview, a computing device 100 includes a hypervisor layer, a virtualization layer, and a hardware layer. The hypervisor layer includes a hypervisor 191 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 110 and a plurality of virtual resources allocated to the at least one operating system 110. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 110 may be referred to as a virtual machine 196. A virtual machine 196 may include a control operating system 105 in communication with the hypervisor 191 and used to execute applications for managing and configuring other virtual machines on the computing device 100.

Referring now to FIG. 1D, and in greater detail, a hypervisor 191 may provide virtual resources to an operating system in any manner which simulates the operating system having access to a physical device. A hypervisor 191 may provide virtual resources to any number of guest operating systems 110a, 110b (generally 110). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 191 executes within an operating system executing on a computing device. In one of these embodiments, a computing device executing an operating system and a hypervisor 191 may be said to have a host operating system (the operating system executing on the computing device), and a guest operating system (an operating system executing within a computing resource partition provided by the hypervisor 191). In other embodiments, a hypervisor 191 interacts directly with hardware on a computing device, instead of executing on a host operating system. In one of these embodiments, the hypervisor 191 may be said to be executing on "bare metal," referring to the hardware comprising the computing device.

In some embodiments, a hypervisor 191 may create a virtual machine 196a-c (generally 196) in which an operating system 110 executes. In one of these embodiments, for example, the hypervisor 191 loads a virtual machine image to create a virtual machine 196. In another of these embodiments, the hypervisor 191 executes an operating system 110 within the virtual machine 196. In still another of these embodiments, the virtual machine 196 executes an operating system 110.

In some embodiments, the hypervisor 191 controls processor scheduling and memory partitioning for a virtual machine 196 executing on the computing device 100. In one of these embodiments, the hypervisor 191 controls the execution of at least one virtual machine 196. In another of these embodiments, the hypervisor 191 presents at least one virtual machine 196 with an abstraction of at least one hardware resource provided by the computing device 100. In other embodiments, the hypervisor 191 controls whether and how physical processor capabilities are presented to the virtual machine 196.

A control operating system 105 may execute at least one application for managing and configuring the guest operating systems. In one embodiment, the control operating system 105 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 191 executes the control operating system 105 within a virtual machine 196 created by the hypervisor 191. In still another embodiment, the control operating system 105 executes in a virtual machine 196 that is authorized to directly access physical resources on the computing device 100. In some embodiments, a control operating system 105a on a computing device 100a may exchange data with a control operating system 105b on a computing device 100b, via communications between a hypervisor 191a and a hypervisor 191b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 105 executes in a virtual machine 196 that is authorized to interact with at least one guest operating system 110. In another embodiment, a guest operating system 110 communicates with the control operating system 105 via the hypervisor 191 in order to request access to a disk or a network. In still another embodiment, the guest operating system 110 and the control operating system 105 may communicate via a communication channel established by the hypervisor 191, such as, for example, via a plurality of shared memory pages made available by the hypervisor 191.

In some embodiments, the control operating system 105 includes a network back-end driver for communicating directly with networking hardware provided by the computing device 100. In one of these embodiments, the network back-end driver processes at least one virtual machine request from at least one guest operating system 110. In other embodiments, the control operating system 105 includes a block back-end driver for communicating with a storage element on the computing device 100. In one of these embodiments, the block back-end driver reads and writes data from the storage element based upon at least one request received from a guest operating system 110.

In one embodiment, the control operating system 105 includes a tools stack 194. In another embodiment, a tools stack 194 provides functionality for interacting with the hypervisor 191, communicating with other control operating systems 105 (for example, on a second computing device 100b), or managing virtual machines 196b, 196c on the computing device 100. In another embodiment, the tools stack 194 includes customized applications for providing improved management functionality to an administrator of a virtual machine farm. In some embodiments, at least one of the tools stack 194 and the control operating system 105 include a management API that provides an interface for remotely configuring and controlling virtual machines 196 running on a computing device 100. In other embodiments, the control operating system 105 communicates with the hypervisor 191 through the tools stack 194.

In one embodiment, the hypervisor 191 executes a guest operating system 110 within a virtual machine 196 created by the hypervisor 191. In another embodiment, the guest operating system 110 provides a user of the computing device 100 with access to resources within a computing environment. In still another embodiment, a resource includes a program, an application, a document, a file, a plurality of applications, a plurality of files, an executable program file, a desktop environment, a computing environment, or other resources made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 110, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 191; in such an embodiment, the driver is typically aware that it executes within a virtualized environment.

In another embodiment, the guest operating system 110, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 105, as described above.

Figure 2:
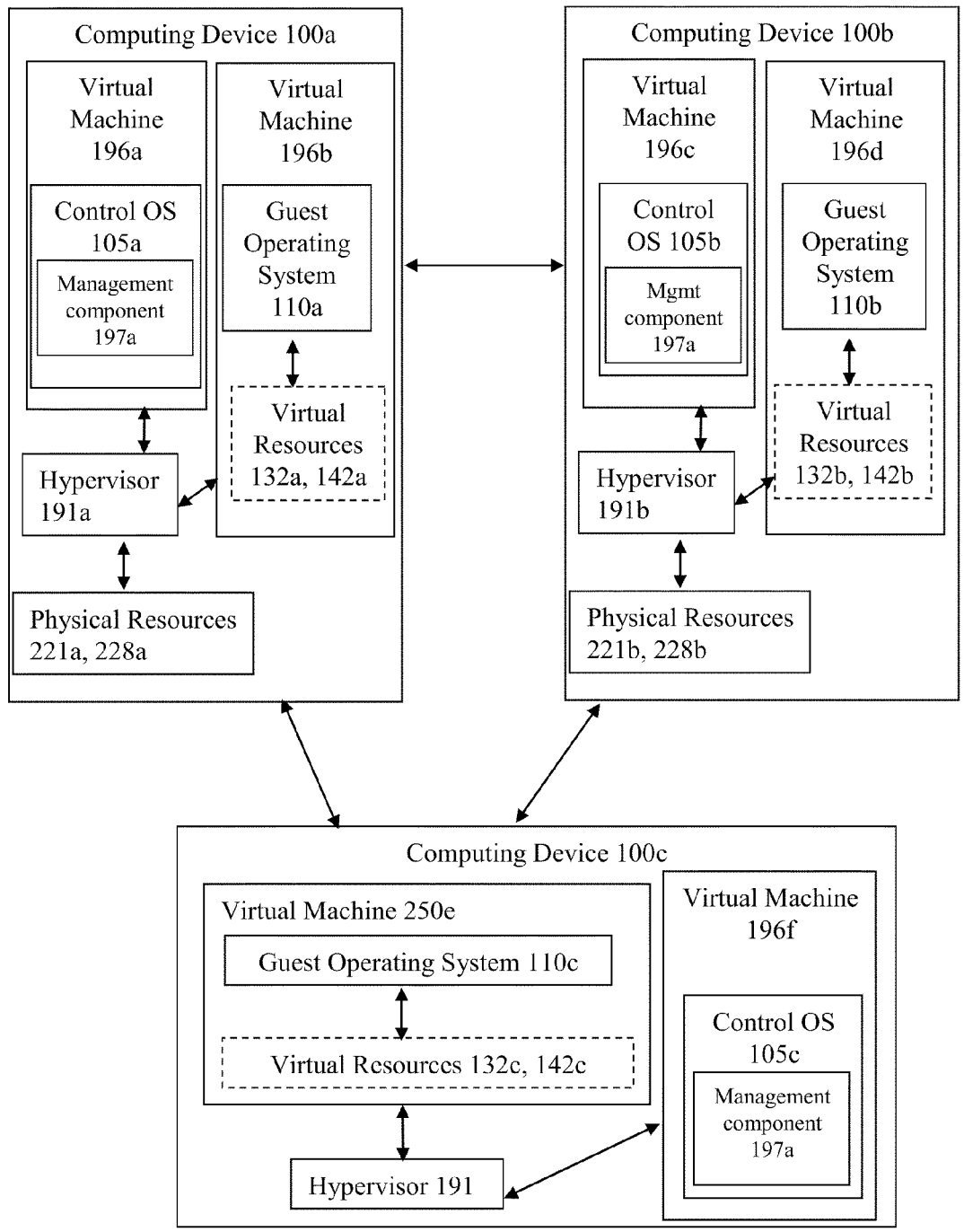
FIG. 2 is a block diagram illustrating an embodiment of a system comprising a virtual machine.

Illustrated in FIG. 2, is a block diagram depicts one embodiment of a plurality of networked computing devices in a system in which at least one physical host executes a virtual machine. In brief overview, the system includes a management component 197 and a hypervisor 191. The system includes a plurality of computing devices 100, a plurality of virtual machines 196, a plurality of hypervisors 191, a plurality of management components referred to as tools stacks 194, and a physical resource 260. The plurality of physical machines 100 may each be provided as computing devices 100, described above in connection with FIGS. 1A-D.

Referring now to FIG. 2, and in greater detail, a physical disk 228 is provided by a computing device 100 and stores at least a portion of a virtual disk 142. In some embodiments, a virtual disk 142 is associated with a plurality of physical disks 228. In one of these embodiments, and as described above in connection with FIGS. 1A-C, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 196 executes is referred to as a physical host 100 or as a host machine 100.

The hypervisor executes on a processor on the computing device 100. The hypervisor allocates, to a virtual disk, an amount of access to the physical disk. In one embodiment, the hypervisor 191 allocates an amount of space on the physical disk. In another embodiment, the hypervisor 191 allocates a plurality of pages on the physical disk. In some embodiments, the hypervisor 191 provisions the virtual disk 142 as part of a process of initializing and executing a virtual machine 250.

In one embodiment, the management component 197a is referred to as a pool management component 197a. In another embodiment, a management operating system 105a, which may be referred to as a control operating system 105a, includes the management component. In some embodiments, the management component is referred to as a tools stack. In one of these embodiments, the management component is the tools stack 194 described above in connection with FIGS. 1A-1D. In other embodiments, the management component 197 provides a user interface for receiving, from a user such as an administrator, an identification of a virtual machine 196 to provision and/or execute. In still other embodiments, the management component 197 provides a user interface for receiving, from a user such as an administrator, the request for migration of a virtual machine 196b from one physical machine 100 to another. In further embodiments, the management component 197a identifies a computing device 100b on which to execute a requested virtual machine 196d and instructs the hypervisor 191b on the identified computing device 100b to execute the identified virtual machine; such a management component may be referred to as a pool management component.

Figure 3:
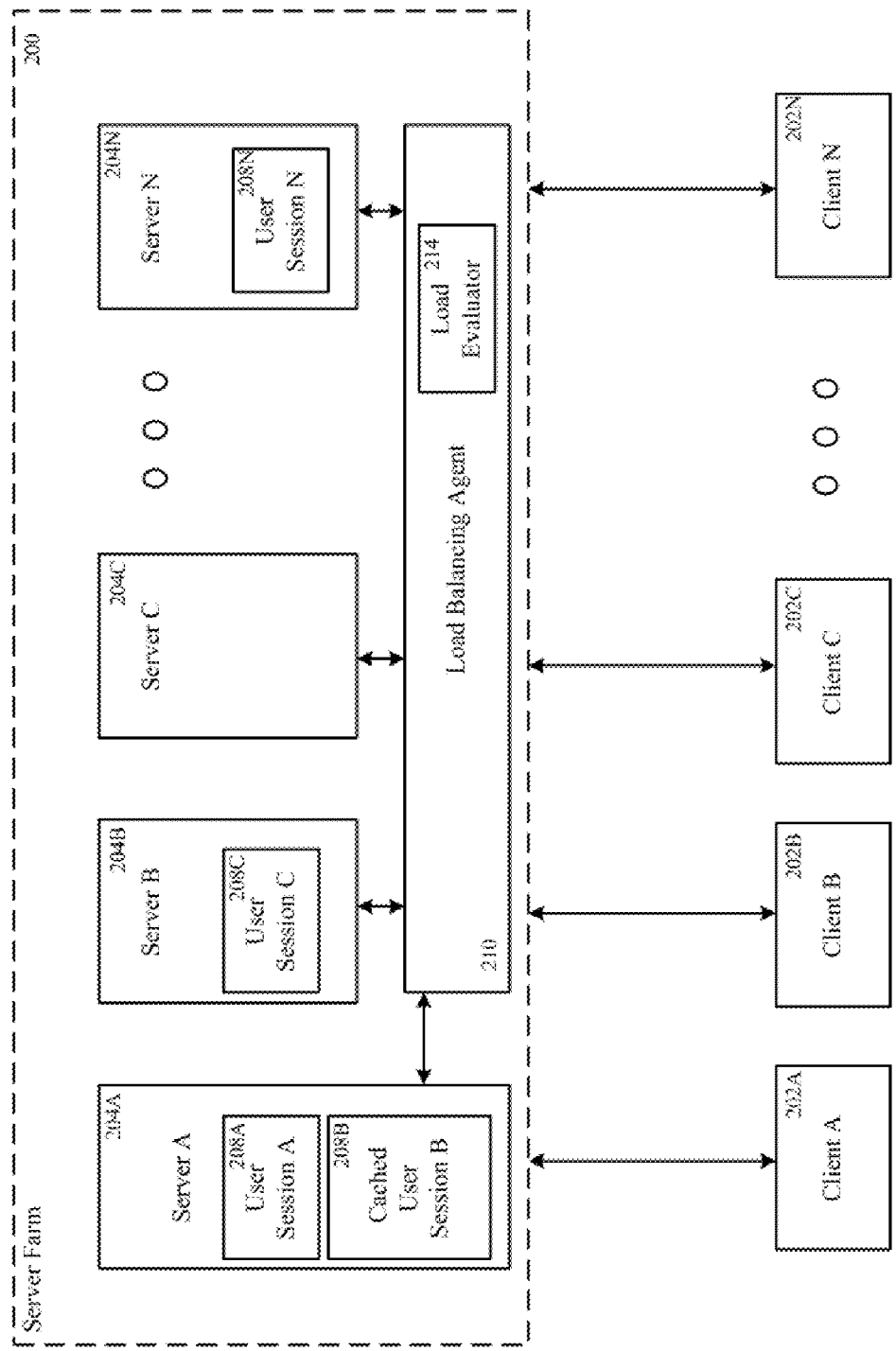
FIG. 3 is a block diagram illustrating an embodiment of a system for load balancing using overbooking and forecasting techniques.

Illustrated in FIG. 3 is an embodiment of a system for load balancing using forecasting and overbooking techniques. The system includes a server farm 200 comprising one or more servers 204A-N (hereinafter collectively referred to as servers 204.) In communication with each server is a load balancing agent 210. The servers 204 can execute or host user sessions 208A-N (hereinafter collectively referred to as user sessions 208,) where some of the user sessions can be cached user sessions 208B. Communicating with the server farm 200 and thereby with at least one of the servers 204 are client computing machines 202A-N (hereinafter collectively referred to as clients 202.) Executing within the load balancing agent 210 or as part of the load balancing agent 210 is a load evaluator 214.

Further referring to FIG. 3, and in more detail, in one embodiment the system includes a server farm 200 comprising one or more servers 204. While FIG. 3 illustrates server A 204A, server B 204B and server C 204C, the server farm 200 can comprise a single server 204 or an "N" number of servers 204 where "N" is a whole number greater than 1. In some embodiments, the server farm 200 includes a group of servers 204 co-located on a common network that can be a private network having a domain particular to the server farm 200. In other embodiments, the server farm 200 includes a group of servers 204 connected to the same network switch, router or other networking appliance or device. For server farms 200 having a large number of servers 204, the network traffic produced by these embodiments can become heavy. One embodiment alleviates heavy network traffic by designating a subset of the servers 204 in a farm 200, typically two or more, as "collector points." Generally, a collector point is a server that collects run-time data. Each collector point stores runtime data collected from certain other servers 204 in the farm 200. Each server 204 in the farm 200 can be capable of operating as, and consequently can be capable of being designated as, a collector point. In one embodiment, each collector point stores a copy of a dynamic store included within the farm 200. In another embodiment, each collector point stores a portion of the dynamic store, e.g., it maintains runtime data of a particular data type. The type of data stored by a server 204 may be predetermined according to one or more criteria. For example, servers 204 may store different types of data based on their boot order. Alternatively, the type of data stored by a server 204 may be configured by an administrator using an administration tool.

In some embodiments, server 204 not designated as collector points can identify or determine which servers 204 within the farm 200 are designated as collector points. A server 204 not designated as a collector point may communicate with a particular collector point when delivering and requesting runtime data. Consequently, collector points lighten network traffic because each server 204 in the farm 200 can communicate with a single collector point server 204, rather than with every other server 204, when seeking to access the runtime data.

Each server 204 can operate as a collector point for more than one type of data. For example, one server 204 can operate as a collector point for licensing information while another server 204 can operate as a collector point for loading information. In these embodiments, each collector point may amass a different type of run-time data. For example, the licensing server 204 can collect licensing information, while the loading server 204 collects loading information.

In some embodiments, each collector point stores data that is shared between all servers 204 in a farm 200. In these embodiments, each collector point of a particular type of data exchanges the data collected by that collector point with every other collector point for that type of data in the farm 200. Thus, upon completion of the exchange of such data, each collector point possesses the same data and can therefore keep every other collector point abreast of any updates to the runtime data.

While FIG. 3 illustrates the servers 204 as present within the server farm 200, in some embodiments the server 204 are not contained within the server farm 200. Similarly Each server 204, in some embodiments, can execute or host a user session. A user session, in some embodiments, is a session during which a particular user establishes a virtual communication channel between a server 204 or the server farm 200 and a client computing machine 202. A user establishes a virtual communication channel, in some instances, by requesting access to an application executing on one or more servers 204. Responsive to this request, the server farm 200 can either direct a server 204 to instantiate an instance of the requested application, or else a particular server 204 can respond to the request by instantiating an instance of the requested application of its own accord. In addition to establishing a virtual communication channel, establishing a user session can include providing the client computing machine with access to a user profile particular to the user using the client to communicate with the server 204. This user profile, in some embodiments, includes applications, configurations, data and files specific to a particular user. In most embodiments, a user session can be characterized as a period of time during which a user accesses an application on a server 204. Therefore, when the user begins accessing the application, the user session begins. Similarly, when the user stops accessing the application, the user session ends. In some embodiments, when a user stops accessing the application, data associated with the user session can be stored in cache or another storage repository for a period of time. The data stored in cache can include: authentication information specific to the user; a copy of the user profile; an event log associated with the user session; or any other information associated with the previously active user session.

While FIG. 3 illustrates servers 204 hosting at least one active user session, each server 204 can host or execute any number of active user sessions. For example, server B 204B can host additional user sessions along with user session C 208C. Similarly, each server 204 can host any number of active user sessions and any number of cached user sessions. Server A 204A, for example, hosts both an active user session, e.g. user session A 208A, and a cached or inactive user session, e.g. user session B 208B. A user session typically corresponds to a user. While FIG. 3 illustrates user sessions corresponding to client computing machines 202, in some embodiments, user session A 208A can correspond to user A. In this embodiment, user A could establish user session A 208A by requesting access to an application executing within the server farm 200 or on server A 204A via the client computing machine A 202A. Similarly, user session C 208C can correspond to user C which can establish user session C 208C via any one of client A, client B, client C, and so on.

Executing within the sever farm 200 is a load balancing agent 210. The load balancing agent 210, in some embodiments, can execute on any server 204 within the server farm 200. In other embodiments, the load balancing agent 210 can execute on any appliance within the server farm. In some embodiments, the load balancing agent 210 can execute on a computing machine not included within the server farm 200. This computing machine, in most embodiments, could communicate with the servers 204 within the server farm 200 via any one of: a server 204; an appliance within the server farm 200; a common private network through which the load balancing agent 210 can send and receive commands and data to the servers 204; or by any other method or device able to transmit and receive commands and data to the servers 204 within the server farm 200.

Figure 4:
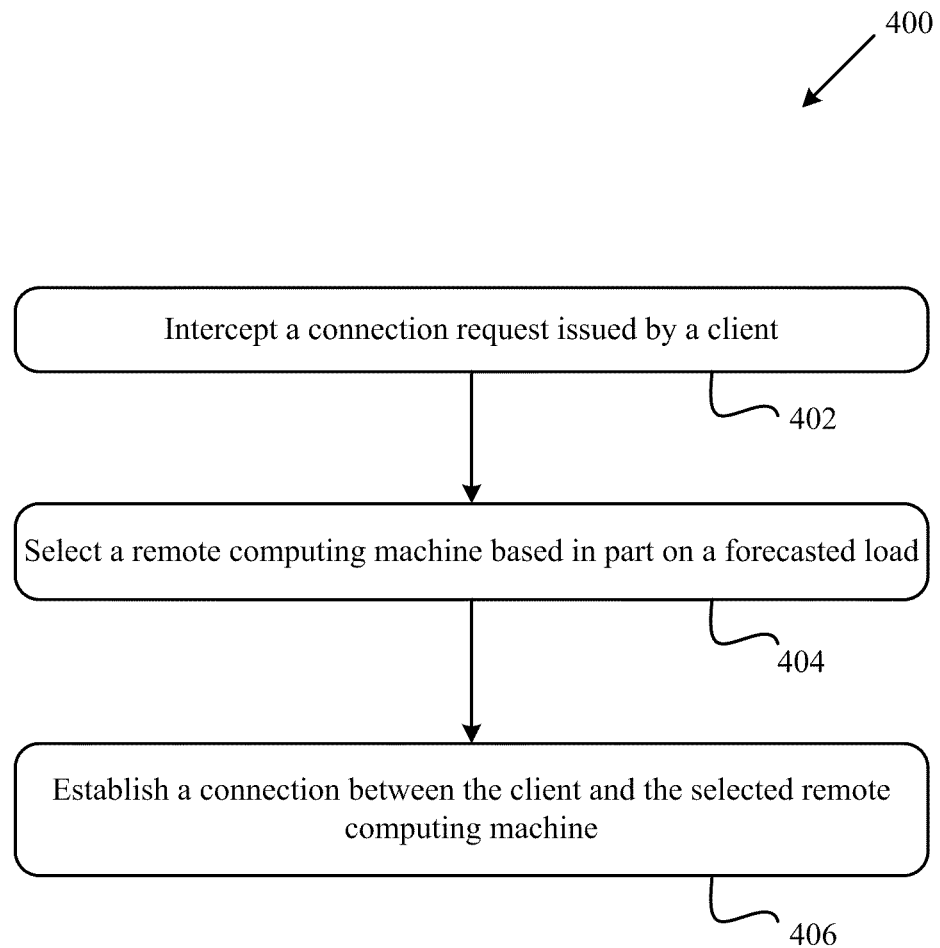
FIG. 4 is a flow diagram illustrating an embodiment of a method for establishing a connection between a first computing machine and a second computing machine.
Figure 5A:
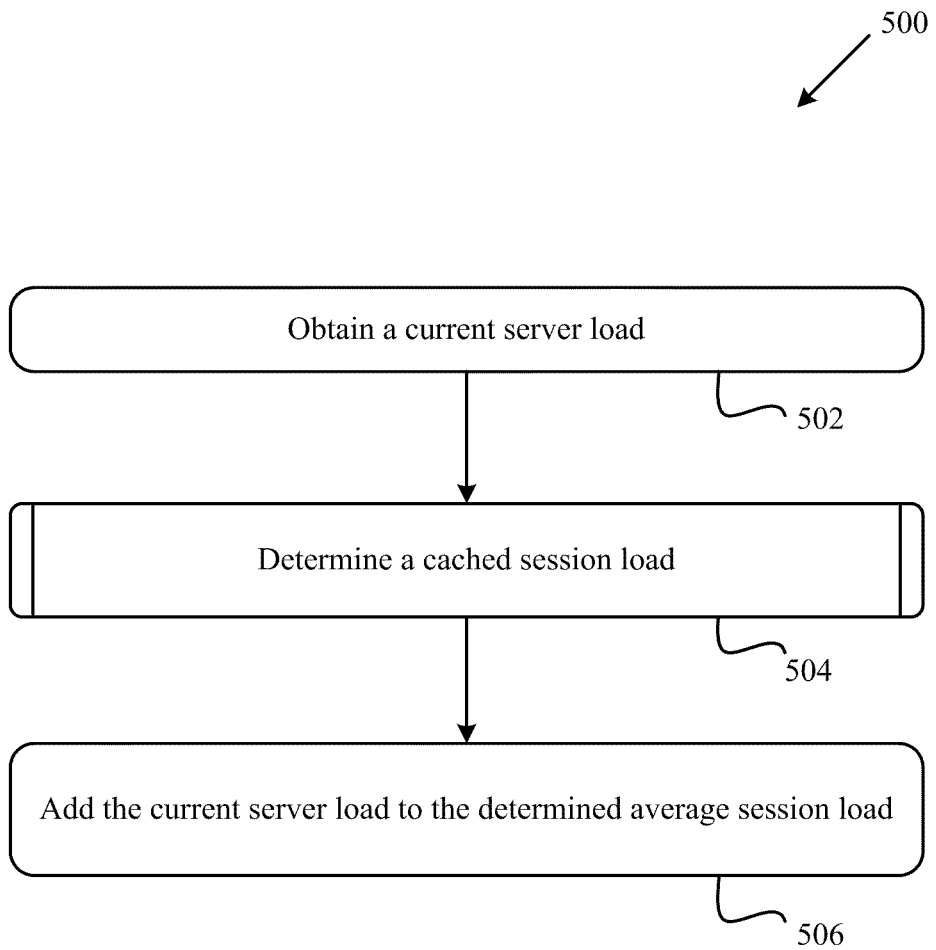
FIGS. 5A-5B are flow diagrams illustrating embodiments of methods for determining a forecasted load.
Figure 5B:
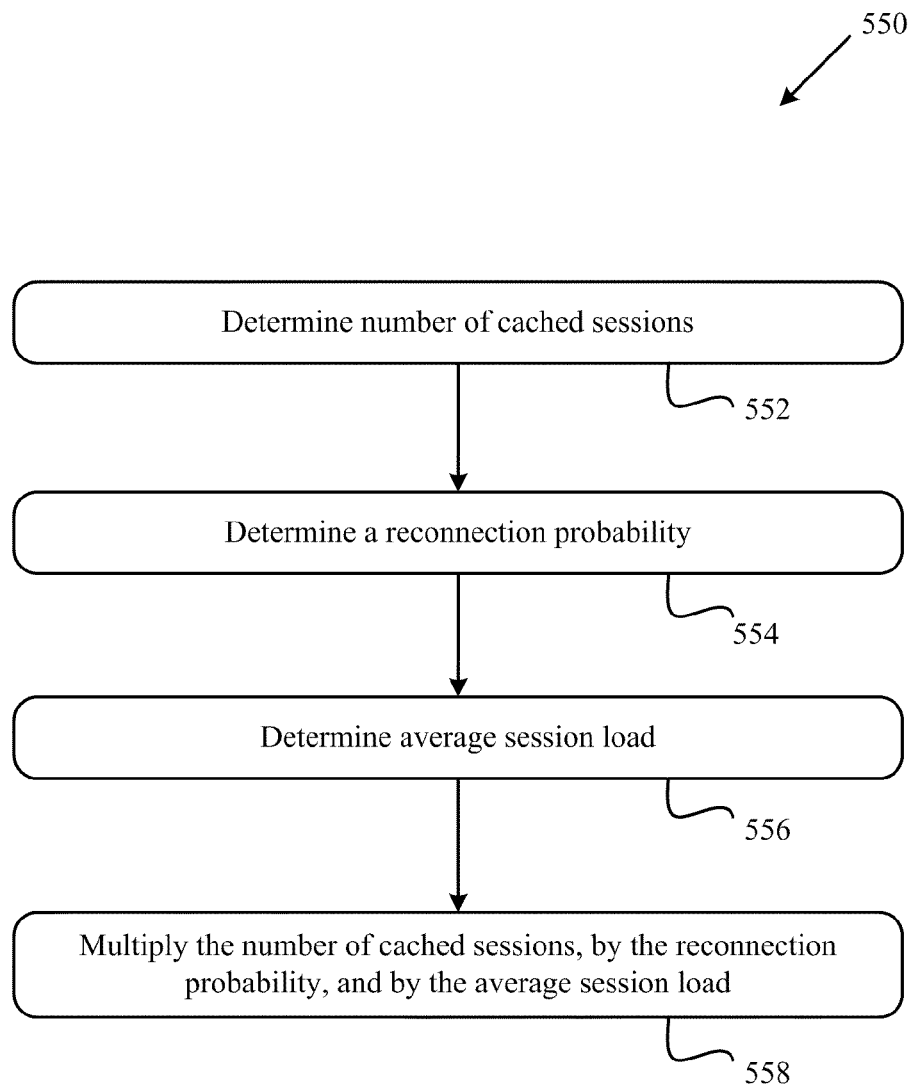
Figure 6:
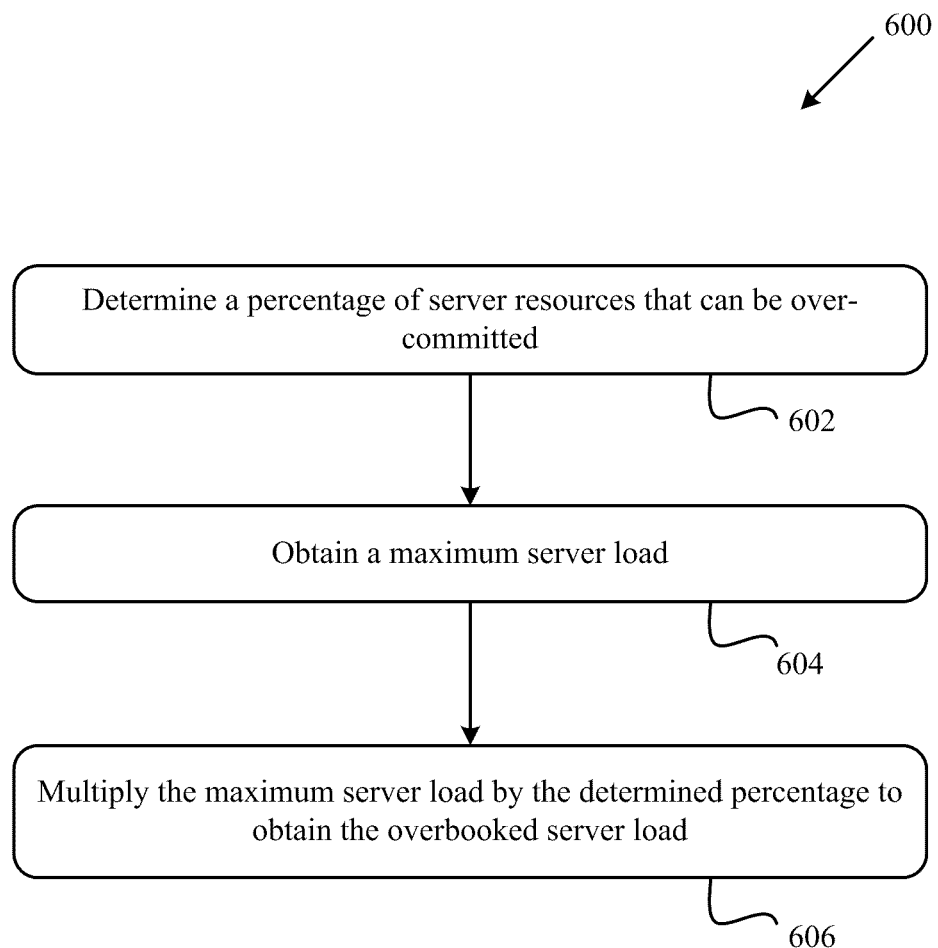
FIG. 6 is a flow diagram illustrating an embodiment of a method for determining an overbooked load.

The load balancing agent 210, in some embodiments, can execute processes such as those described in FIGS. 4-6 to balance an amount of load amongst one or more servers 204. Load can include any application or requests that require computing or memory resources. The amount of load on a computing machine can, in some embodiments, comprise the amount of processing and memory resources used by processes and applications executing on a computing machine. Balancing load can include directing application execution requests and requests to establish user sessions from one computing machine to another computing machine. Thus, the processor and memory resources used to execute an application instance or host a user session are shouldered by the computer to which that application execution request or user session establishment request is directed.

In one embodiment the load balancing agent 210 can comprise a software module or agent that executes within the distributed computing environment or server farm 200, or on a server 204 within the server farm 200. In other embodiments, the load balancing agent 210 can be hardware able to perform the load balancing methods and processes described herein. In still other embodiments, the load balancing agent 210 can be any combination of software and hardware able to perform the load balancing methods and processes described herein.

In some embodiments, the load balancing agent 210 can execute or executes in accordance with a load evaluator 214. The load evaluator 214 can in some embodiments be a software module or agent that executes within the load balancing agent 210 to perform the methods and processes described herein. In other embodiments, the load evaluator 214 can be hardware able to perform the methods and processes described herein. In still other embodiments, the load evaluator 214 can be any combination of hardware and software able to perform or execute the methods and processes described herein.

The load evaluator 214, in one embodiment, can execute on a server 204 within the server farm 200, or in another embodiment can execute on a computing machine or other appliance within the server farm 200. In some embodiments, the load evaluator 214 can execute on a computing machine remotely located from the server farm 200 but in communication with anyone of a server 204, computing machine or appliance within the server farm 200. While FIG. 3 illustrates an embodiment where the load evaluator 214 executes within the load balancing agent 210, in other embodiments the load evaluator 214 can execute outside of the load balancing agent 210. In one embodiment the load evaluator 214 can communicate with any server 204 included within the server farm 200, and in some embodiments can communicate directly with clients 202 communicating with servers 204 within the server farm 200.

The load evaluator 214, in some embodiments, can evaluate the amount of load on a particular server 204 by evaluating the server 204 to determine any of the following: the amount of memory used by processes and applications executing on the server 204; the amount of processor resources used by processes and applications executing on the server 204; the number of processes executing on the server 204; the number of applications executing on the server 204; the number of virtual machines executing on the server 204; the number of user sessions executing on the server 204; the number of cached user sessions; the amount of available cache; the amount of bandwidth used by the server 204; and any other metric that can be used to determine the amount of load on a machine. The load evaluator 214 can determine the amount of load on each individual server 204 within the server farm 200. The load evaluator can also determine the amount of load on a particular user session by determining any of the following: the amount of memory used by the session; the amount of processor resources used by the session; the number of processes and applications or application instances executing within the sessions; the amount of cache available to the session; the amount of cache used by the session; the amount of bandwidth used by the session; and any other metric that can be used to determine the amount of load on a machine.

In some embodiments, the load evaluator 214 can determine an average load on the sessions hosted on a particular server 204 or hosted within the server farm 200, by determining the amount of load on each session on a server 204 or within the server farm 200 and based on the results, determining an average session load. In other embodiments, the load evaluator 214 can determine an average session load by determining the amount of load on a predetermined number of user sessions and averaging the determined session loads to arrive at an average session load. The predetermined number of user sessions can be dictated by a user, by a system administrator, based in part on the number of user sessions executing on a server 204 or within a server farm 200, or by any other method. In one embodiment, the predetermined number of sessions is the number of active sessions executing within the server farm 200. In another embodiment the predetermined number of sessions is the number of active sessions executing on a particular server 204. In still other embodiments, the predetermined number of sessions is an average number of sessions hosted by a server 204.

Communicating with the server farm 200 are clients 202. Each client 202 can be any of the clients or computing machines described herein. Installed between the clients 202 and the server farm 200 can be a virtual communication channel such as any of the communication channels described herein. Further, the clients 202 can communicate with the server farm 200 over a network 104 such as any of the networks 104 described herein. A client 102 can host one or more user sessions. For example a first user can use client A 202A to communicate with the server farm 200. Similarly, a second user can use client A 202A to communicate with the server farm 200. In some instances, the user session established by the first user and the user session established by the second user are tow different user sessions.

While FIG. 3 illustrates the clients 202 communicating with the server farm 200, in some embodiments, the clients 202 communicate with the load balancing agent 210. In other embodiments the clients communicate with the load evaluator 214. In still other embodiments, the clients 202 can communicate with a particular server 204 within the server farm 200.

Illustrated in FIG. 4 is a method 400 for selecting a server 204 based on a forecasted load. In one embodiment, the load balancing agent 210 or another program or agent executing within the server farm 200 can intercept a connection request issued by a client 202 (Step 402). The load balancing agent 210 can then select a remote computing machine based in part on a forecasted load (Step 404). Upon selecting a remote computing machine, the load balancing agent 210 can facilitate establishing a connection between the client 202 and the selected remote computing machine (Step 406).

Referring to FIG. 4, and in greater detail, in one embodiment the method 400 is carried out by a load balancing agent 210 executing within the server farm 200. In other embodiments the method 400 is carried out by a load balancing agent 210 executing on a computing machine within a distributed computing system comprising the clients 202 and the servers 204. In other embodiments the load balancing agent 210 executes on an appliance.

In one embodiment, the load balancing agent 210 can intercept a connection request issued by a client 202 (Step 402). The client 202, in some embodiments, issues or generates the connection request responsive to user input indicating that the user would like to connect to a particular application. In other embodiments, the client 202 issues the connection request responsive to user input indicating that the user would like to establish a user session. This request can include logging into a remote protocol agent on the client 202.

In some embodiments, the load balancing agent 210 can be in communication with a network interface card on an appliance within the server farm 200 such that, any time a request to connect is received, the load balancing agent 210 may intercept that request. In other embodiments, the load balancing agent 210 may be in communication with one or more application/desktop delivery programs executing on one or more servers 204 such that each time the one or more application/desktop delivery programs receives a request to connect or a request to establish a user session, the load balancing agent 210 can intercept that request. Intercepting a request to connect or establish a user session can, in some embodiments, include hooking into an application/desktop delivery program such as the ICA client and determining when a call is made to establish a user session. In other embodiments, a client agent can modify the connection request so that the connection request is forwarded to a load balancing agent 210.

Once the load balancing agent 210 intercepts the connection request, the load balancing agent can then select a remote computing machine based in part on a forecasted load (Step 404). In some embodiments, the load balancing agent 210 can select a server 204 based on a forecasted load, while in other embodiments the load balancing agent 210 can select a cached user session on a server 204 based on a forecasted load. The forecasted load, in some embodiments, can be determined using the methods and processes described herein. In other embodiments, the forecasted load can be transmitted by a program, client or agent executing on another computing machine. The forecasted load, in some embodiments can be determined by the following equation:

Forecasted Server Load=(Current Server Load)+
[(Number of Cached Sessions)*(Reconnection
Probability)*(Average Session Load)].

In other embodiments, the forecasted load can be empirically determined by monitoring the load on one or more servers 204 and extrapolating a current load value to predict a future load.

Once the load balancing agent 210 knows the forecasted load for either each server 204, a particular server 204 or for the server farm 200; then the load balancing agent 210 can select a server 204 having a minimal amount of forecasted load. In some embodiments, the load balancing agent 210 can select a server 204 have a maximum amount of forecasted load. In each of these embodiments, the minimal amount of forecasted load and the maximum amount of forecasted load can be determined by comparing each server's 204 forecasted load to the other servers' 204 forecasted load. Thus, if a first server 204 can have more forecasted load than a second and third server, then the first server 204 has the maximum forecasted load or the most forecasted load. In contrast, if the third server has less forecasted load than the first server and the second server, then the third server has the least amount of forecasted load. Similarly, a maximum amount of forecasted load can be determined by comparing a forecasted load amount to a scale. If the forecasted load amount exceeds a threshold amount, then the forecasted load amount is a maximum amount of forecasted load. A minimum amount of forecasted load, in this example, can be determined by comparing a forecasted load amount to a scale to determine whether the forecasted load amount falls below a threshold amount. If the forecasted load falls below a threshold amount, then the forecasted load is a minimum amount of forecasted load.

Once a server 204 or remote computing machine is selected by the load balancing agent 210, the load balancing agent 210 can facilitate establishing a connection between the client and the selected server 204 (Step 406). Establishing a connection can include establishing a virtual channel between the server 204 and the client 202. In some embodiments, establishing a virtual channel can include establishing a secure connection over which the server 204 and the client 202 can transmit information using a remote presentation level protocol.

Illustrated in FIG. 5A is a method 500 for determining a forecasted load amount. The method 500 includes obtaining a current server load (Step 502), determining a cached session load (Step 504), and adding the current server load to the average session load (Step 504).

Further referring to FIG. 5A, and in more detail, in one embodiment the method 500 can be carried out by a load balancing agent 210. In other embodiments, the method 500 can be carried out by any combination of a load balancing agent 210 and a load evaluator 214. The method 500, in some embodiments, can be carried out by a forecaster or other client, agent or program able to forecast server load according to the methods and systems described herein.

In one embodiment, the load balancing agent 210 obtains a current server load (Step 502). Obtaining a current server load, in some embodiments, includes obtaining a current server load from a load evaluator 214. The load evaluator 214 can obtain the load on any one of the servers 204 within the server farm 200 or within the distributed computing system, and forward that load to the load balancing agent 210. In contrast, the load balancing agent 210 can request the current server load for a particular server 204 and the load evaluator 214 can responsively retrieve the load amount from memory, or analyze the selected server 204 and send the load balancing agent 210 the amount of determined load on that server.

Upon obtaining the current server load, the load balancing module 210 can then determine a cached session load (Step 504). In some embodiments, the average session load can be determined according to the methods and processes described in FIG. 5B. In other embodiments, the average session load can be determined by requesting that the load evaluator 214 obtain and forward the average session load. In response, the load evaluator 214 can retrieve the average session load from memory and forward that load value to the load balancing module 210. In other embodiments, the load evaluator 214 can carry out the method described in FIG. 5B to determine the average session load and forward that value to the load balancing module 210.

Determining the forecasted load can comprise adding the current server load determined in Step 502 to the average session load determined in Step 504. In some embodiments, the load balancing module 210 can determine the forecasted load by adding the current server load to the average session load (Step 506). In still other embodiments, the load evaluator 514 can determine the forecasted load by adding the current server load to the average session load (Step 506). Upon determining the forecasted load, in some embodiments, the load balancing module 210 can select a server 204 having a particular load, a minimum load, or a maximum load. The load balancing module 210 can then establish a connection between the selected server 204 and the client 202.

Illustrated in FIG. 5B is one embodiment of a method 550 for determining a cached session load. A load evaluator 214 or load balancing agent 210 first determines the number of cached sessions (Step 552), then determines a reconnection probability (Step 554) and an average session load (Step 556). The cached session load is then determined by multiplying the number of cached sessions, by the reconnection probability and the average session load (Step 558).

Further referring to FIG. 5B, and in more detail, in one embodiment a load evaluator 214 or load balancing agent 210 determines the number of cached sessions (Step 552) on a particular server 204. The load evaluator 214 can determine the number of cached user sessions by analyzing the cached memory on the server 204 to determine a number of inactive user sessions stored in cache. In particular, the load evaluator 214 can determine the number of user session credentials stored in cache. Upon determining this, the load evaluator 214 can then determine how many of the user session credentials are associated with inactive sessions by either reviewing each set of credentials or by determining the number of active user sessions executing on the server 204. In some embodiments, each server 204 can comprise a session table that monitors the active user sessions and the inactive user sessions stored in cache. Determining the number of cached user sessions can comprise querying the session table on the server 204.

Once the number of cached sessions is determined (Step 552), the load balancing module 210 or the load evaluator 214 can determine a reconnection probability. In one embodiment, the reconnection probability can be hard-coded into either the load balancing module 210 or the load evaluator 214 by a program, user or administrator. In other embodiments, the reconnection probability can be determined empirically by tracking on average how many user sessions reconnect. Tracking the number of reconnected user sessions can be done on a per server 204, per server farm 200 or per user basis. Thus, the reconnection probability can in some embodiments be associated with a particular server 204, server farm 200 or user.

A reconnection probability, in one embodiment, is the probability that a cached user session will reconnect. Reconnection occurs when a cached, inactive user session is reactivated by connecting a pending request to establish a user session with the inactive user session thereby reactivating the inactive session. Reconnection, or reactivation of an inactive user session, can occur when a user instigates a connection request and the load balancing module 210 or another module or program executing within the distributed computing environment identifies a cached user session and establishes a connection between the client 202 used by the user and the cached user session. Reconnection probability is the probability that a user will reconnect to a previously active user session.

Upon determining the reconnection probability, the load evaluator 214 or load balancing module 210 can determine the average session load (Step 556) via any of the methods described herein. Upon determining the average session load (Step 556), the cached session load can be determined by multiplying the number of cached sessions, by the reconnection probability and by the average session load (Step 558).

Illustrated in FIG. 6 is one embodiment of a method 600 for balancing load by overbooking. The load balancing module 210, in one embodiment, determines a percentage of server resources that can be overcommitted (Step 602). Then either the load evaluator 214 or the load balancing module 210 determines a maximum server load (Step 604), and the maximum server load is multiplied by the determined percentage to obtain the overbooked server load (Step 606).

Further referring to FIG. 6, and in more detail, in one embodiment sections of the method 600 can be carried out by the load balancing module 210 while in other embodiments sections of the method 600 can be carried out by the load evaluator 214. In one embodiment, any combination of the load balancing module 210 and the load evaluator 214 can carry out the process 600. In still other embodiments, any program, client or agent can carry out any section of the process 600.

In one embodiment, the load balancing module 210 can determine a percentage of server resources that can be overcommitted (Step 602). The load balancing module 210, in one embodiment, can determine the percentage of server resources that can be overcommitted by determining the maximum load of the server and pushing the server 204 until the server 204 times out. In still other embodiments, the percentage of server resources that can be overcommitted can be a characteristic of the server 204 such that querying the server for the maximum amount of resources that can exceed the server's maximum amount will cause the server 204 to return a value representative of the percentage of server resources that can be overcommitted. In one embodiment, the percentage of server resources that can be overcommitted is a value that is stored on a server 204 or within the server farm 200. When the load balancing module 210 or when any program wishes to know the percentage of server resources that can be overcommitted, the program need only query the table. In response, the program will receive the representative percentage. In still other embodiments, the percentage of server resources that can be overcommitted is a predetermined value that is hardcoded in by a user, application or administrator.

After determining the percentage of server resources that can be overcommitted, the load evaluator can obtain a maximum server load (Step 604). The maximum server load, in some embodiments, is a characteristic of a particular server 204. Therefore determining the maximum server load can include querying a particular server 204 or servers 204 for the maximum server load. In another embodiment, a table or storage repository either on a server 204 or within the server farm 200 can store the maximum server load for each server 204 within the server farm 200. Determining the maximum server load can be accomplished by querying the table or storage repository.

In one embodiment, once the maximum server load and percentage of server resources that can be overcommitted is determined, the load balancing module 210 can determine the overbooked server load by multiplying these two values (Step 606).

After determining the amount of load by which one or more servers can be overbooked, the load balancing module 210 can distribute load so that each server 204 operates according to the determined overbooking standard. Thus, the load balancing module 210 may continue to place load on a server 204 until that server 204 reaches the overbooked server load for that server 204.

Figure 7A:
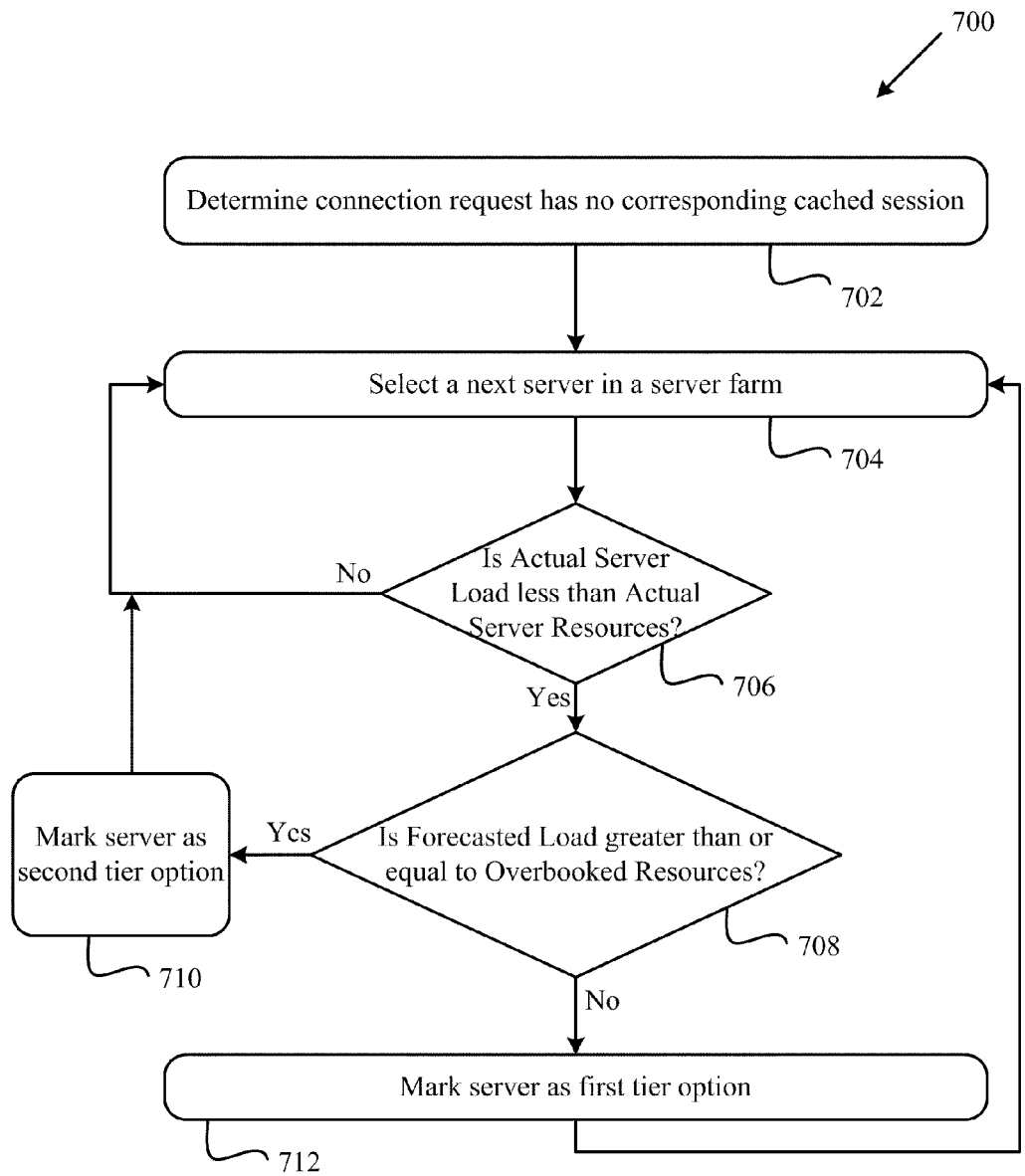
FIGS. 7A-7C are flow diagrams illustrating embodiments of methods for load balancing.

Illustrated in FIG. 7A is one embodiment of a method 700 for determining which server to connect to when a connection request has no corresponding cached session. A load balancing agent 210 first determines that a connection request does not have a corresponding cached session (Step 702). Upon determining this, the load balancing agent begins reviewing each server within a server farm by selecting a first server and then selecting a next server in the server farm (Step 704). The load balancing agent 210 then determines whether the actual load on that selected server is less than the actual server resources on that selected server (Step 706). When the actual server load is greater than the actual server resources, the load balancing agent 210 determines this server is not a candidate and selects a next server in the server farm (Step 704). When the actual server load is less than the actual server resources, the load balancing agent 210 determines this server could be a candidate and determines whether the forecasted load for this selected server is greater than or equal to the overbooked resources value (Step 708). When the forecasted load for that server is greater than or equal to the overbooked resources, the load balancing agent 210 identifies this as a second tier option (Step 710) and selects a next server in the server farm (Step 704). When the forecasted load for the server is less than the overbooked resources, the load balancing agent 210 identifies this as a first tier option (Step 712) and selects a next server in the server farm (Step 704).

Further referring to FIG. 7A, and in more detail, in one embodiment the load balancing agent 210 responds to a connection request by first determining whether the connection request has a corresponding cached session (Step 702). Determining whether there is a corresponding cached session can include identifying a user that initiated the connection request. Upon identifying the user or an identifier of the user, the load balancing agent 210 can then cycle through each cached session to determine whether the cached session contains a characteristic or attribute equal to or associated with the user's identifier. In another embodiment, the load balancing agent 210 can identify a session identifier or client identifier of the connection request. Upon identifying the session identifier or the client identifier, the load balancing agent 210 can cycle through each cached session to determine whether the cached session contains a characteristic or attribute equal to or associated with the session or client identifier. In yet another embodiment, determining that a connection request is not associated with a cached session can include determining that a cached session associated with the connection request was killed.

Selecting a next server in the server farm (Step 704) can include selecting a first server in the server farm. In embodiments where a first server has not yet been selected, the load balancing agent 210 can select a first server in the server farm (Step 704). The load balancing agent 210, in some embodiments, can select a server in a server farm by cycling through an enumeration of each server in a server farm. This enumeration can be ordered or random, and can include servers corresponding to a set of criteria or can include each server in a server farm. The server farm can be any server farm and any server farm described herein. Similarly, the selected server can be any server and any server described herein.

In one embodiment, the load balancing agent 210 determines whether the actual server load on a selected server is less than the actual server resources available on the selected server (Step 706). Each server, in some embodiments, carries an actual load characterized by the applications and services hosted by that server. Each server, in some embodiments, also has an predetermined number of actual server resources available for executing applications and hosting services. Identifying the amount of actual load can include determining any of the following: the amount of available memory; the percentage of the CPU currently being used; the amount of physical memory currently being used; the amount of kernel memory currently being used; the number of threads being processed; the number of processes running on the server; the number of applications and/or services running on the server; and any other characteristic that details the amount of actual load on the server. Identifying the amount of actual server resources can include determining the size of the CPU, the number of available processors, the amount of volatile and non-volatile memory, the amount of bandwidth available to that server, and any other characteristic or variable that details the amount of resources available on a server.

When the load balancing agent 210 determines that the amount of actual server resources is less than the actual server load, the load balancing agent 210 skips this server and selects the next server in the server farm (Step 704). When the actual server load is greater than the amount of actual server resources, the selected server is already overbooked and likely cannot handle hosting another user session. Therefore, the load balancing agent 210 determines that this server is not a candidate because the server likely does not have the resources available for another user session.

When the load balancing agent 210 determines that the amount of actual server resources is greater than the actual server load, the load balancing agent 210 then determines whether the forecasted load is greater than or equal to the overbooked resources (Step 708). The forecasted load and the overbooked resources can be determined by any of the methods described herein. In one embodiment, the forecasted load is specific to the selected server in that it is the forecasted load should the session be established on the selected server. Similarly, in some embodiments, the overbooked resource value is specific to the selected server in that it is the maximum amount of resources that the selected server can handle.

When the load balancing agent 210 determines that the forecasted load is greater than or equal to the overbooked resources (Step 708), the load balancing agent 210 then marks the selected server as a second tier option (Step 710) and proceeds to select the next server in the server farm (Step 704). When the load balancing agent 210 determines that the forecasted load is less than the overbooked resources (Step 708), the load balancing agent 210 then marks the selected server as a first tier option (Step 712) and proceeds to select the next server in the server farm (Step 704).

In one embodiment, the method 700 illustrated in FIG. 7A can continue to cycle through the servers in the server farm for a predetermined period of time. In another embodiment, the method 700 can continue to cycle through the servers in the server farm until all servers have been evaluated. In yet another embodiment, the method 700 can continued to cycle through the servers in the server farm until a first tier option is reached. In one embodiment, when no server is identified as either a first tier or second tier option, the load balancing agent 210 notifies the user and/or the system that the connection cannot be made.

Figure 7B:
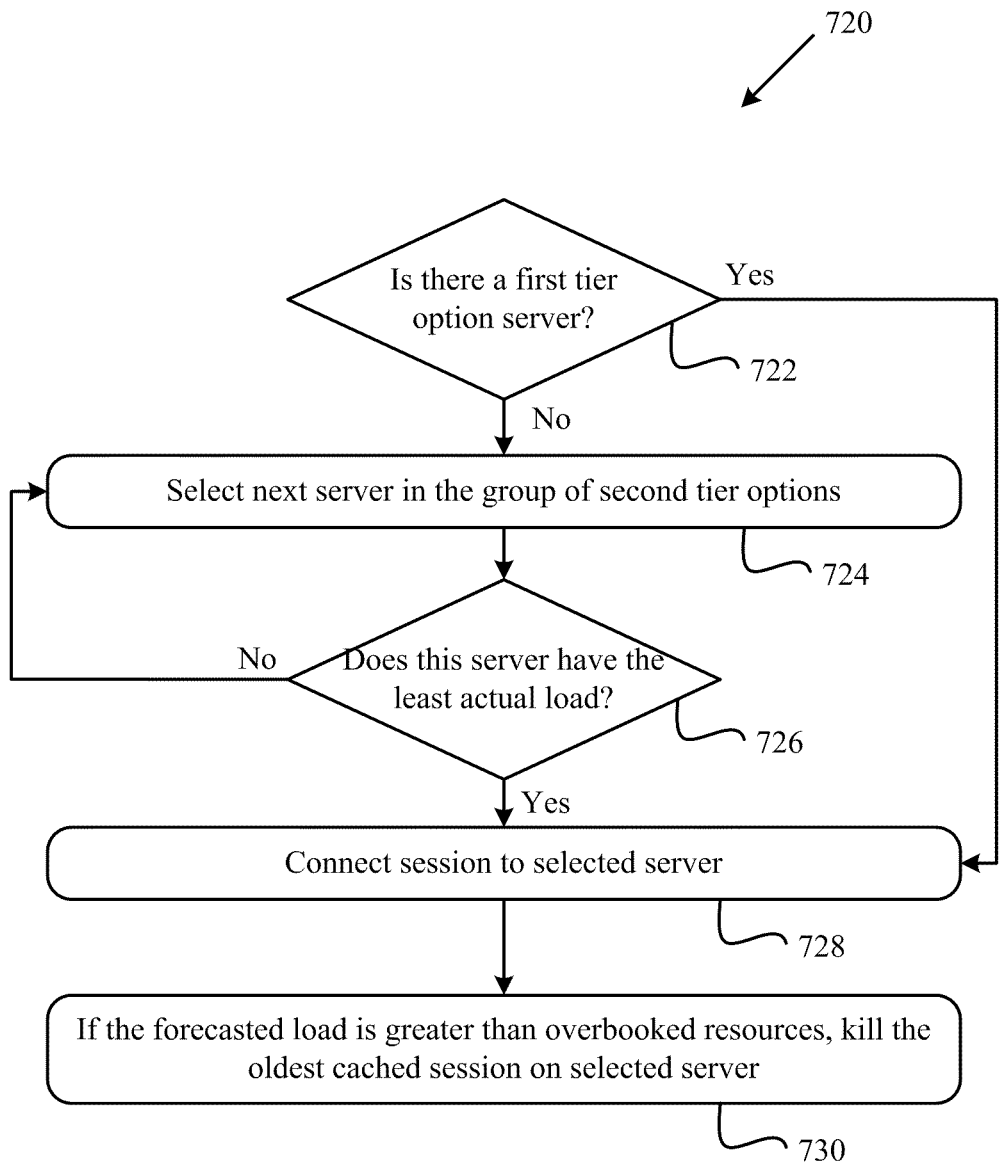

Illustrated in FIG. 7B is one embodiment of a method 720 for cycling through servers in a server farm to identify a server on which a user session can be established. The load balancing agent 210 can first determine whether there is server marked as a first tier option within the server farm (Step 722). When there is a first tier option, the load balancing agent then connects the session to the selected first tier option server (Step 728). When none of the servers are a first tier option, the load balancing agent 210 then selects a server from amongst a group of servers identified as second tier options (Step 724). Upon selecting a next or first server, the load balancing agent 210 determines whether the selected server has the least actual load out of all the servers in the second tier option group of servers (Step 726). When the selected server does not have the least actual load, the load balancing agent 210 then selects the next server in the second tier option group of servers (Step 724). When the selected server does have the least actual load, the load balancing agent 210 connects the session to the selected server (Step 728). Upon connecting the session to the selected server, the load balancing agent 210 determines whether the forecasted load is greater than the overbooked resources, and if they are, kills the oldest cached session on the selected server (Step 730).

Further referring to FIG. 7B, and in more detail, in one embodiment the load balancing agent 210 determines whether there are one or more servers identified as a first tier option (Step 722). In embodiments where there are multiple first tier option servers, the load balancing agent 210 can select from amongst that group of servers the server having the least actual load. In another embodiment, the load balancing agent 210 can select the first identified first tier server.

When there are no first tier server options, the load balancing agent then cycles through each of the servers identified as a second tier option and selects a second tier option server having the least amount of actual load. In one embodiment, this includes selecting a server from a group of servers identified as second tier options (Step 724) and determining whether the selected server has the least actual load of any other server in the group of servers identified as second tier options (Step 726). When the server does have the least actual load, the load balancing agent 210 connects the session request to the selected server (Step 728). In some embodiments, the load balancing agent 210 executes or otherwise assigns the user session to the selected server (Step 728).

Figure 7C:
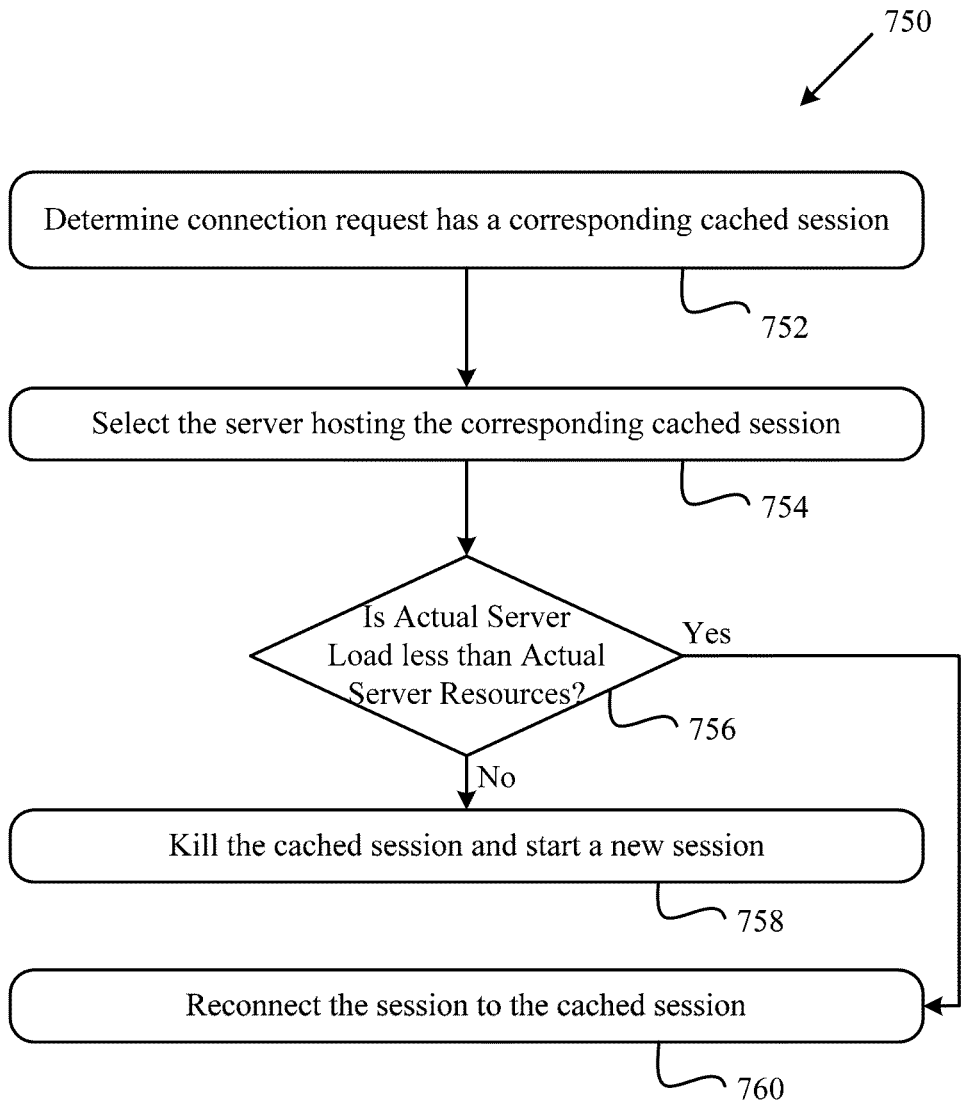

Illustrated in FIG. 7C is one embodiment of a method 750 for connecting a session request to a cached session. A load balancing agent 210 determines whether a connection request has a corresponding cached session. Upon determining that the connection request does have a corresponding cached session (Step 752), the load balancing agent 210 selects the server hosting or storing the corresponding cached session (Step 754). Upon selecting the server, the load balancing agent 210 then determines whether the actual load on the selected server is less than the actual server resources available on that server (Step 756). When the load balancing agent 210 determines that the actual load is less than the actual server resources, the load balancing agent 210 connects the session request to the cached session (Step 760). When the load balancing agent 210 determines that the actual load is greater than the actual server resources, the load balancing agent 210 kills the cached session and starts a new session (Step 758).

Further referring to FIG. 7C, and in more detail, in one embodiment the load balancing agent 210 determines that there is a cached session that corresponds to the connection request via any of the methods or processes described herein. Similarly, the load balancing agent 210 determines that the actual server load is less than the actual server resources via any of the methods or processes described herein. When a cached session is killed and a new session is started, the new session can be started via any of the methods or processes described herein.

The methods and systems described herein may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the present disclosure has described multiple embodiments of systems and methods for launching an application into an existing isolation environment, it should be understood by those skilled in the art that various changes in form and detail may be made therein without departing from the spirit and scope of the disclosure as defined by the following claims.

What is claimed is:

1. A method for establishing a session between a first computer and an application executing on another computer, the method comprising:
    intercepting, by a load balancing agent executing on a first computer, a connection request generated by the first computer to establish a session with an application;
    determining whether the connection request has a corresponding cached session;
    identifying, by the load balancing agent responsive to determining the connection request does not correspond to a cached session, a second computer executing an instance of the requested application by evaluating a forecasted load,
    the forecasted load calculated by adding a current load value representative of a current load on the second computer to a load value for a distributed computing environment comprising the first computer and the second computer, wherein the load value for the distributed computing environment is based on a number of cached sessions, a reconnection probability and an average session load;
    wherein determining the load value for the distributed computing environment further comprises:
    identifying an average load on a plurality of sessions executing on the second computer;
    identifying a cached session value associated with an amount of cached sessions within the plurality of sessions;
    identifying a probability that a cached session reconnects; and
    multiplying the average load by the cached session value and the probability; and connecting the first computer to the application executing on the second computer.

2. The method of claim 1, wherein the plurality of sessions further comprises cached sessions and active sessions.

3. The method of claim 1, further comprising measuring the average load on the plurality of sessions by evaluating any of the following:
    a number of active sessions in the distributed computing environment;
    a number of cached sessions in the distributed computing environment;
    a number of computers in the distributed computing environment; and
    an average number of cached and active sessions hosted by each computer in the distributed computing environment.

4. The method of claim 1, further comprising determining the current load value by evaluating any of the following:
    a number of page faults;
    an amount of memory used by the second computer;
    an average amount of time the second computer uses a central processing unit of the second computer; and
    a number of sessions hosted by the second computer.

5. The method of claim 1, wherein identifying the second computer further comprises:
    determining a load on the second server is less than an amount of available second server resources; and
    determining the forecasted load is less than an amount of overbooked resources available to the second server.

6. The method of claim 1, wherein identifying the second computer further comprises:
    determining a load on the second server is less than an amount of available second server resources; and
    determining the forecasted load is greater than an amount of overbooked resources available to the second server.

7. The method of claim 1, further comprising:
    determining whether the forecasted load is greater than an amount of overbooked resources available to the second server; and
    stopping, based on a determination that the forecasted load is greater than the amount of overbooked resources, an oldest cached session on the second server.

8. The method of claim 1, further comprising:
    determining the connection request corresponds to a cached session;
    identifying, responsive to determining the connection request corresponds to a cached session, a third computer executing the cached session;
    determining whether a current load on the third computer is less than resources available to the third computer; and
    connecting the first computer to the application executing on the third computer based on a determination the current load is less than the available resources.

9. The method of claim 8, further comprising:
    determining the current load is greater than the available resources; stopping execution of the cached session; and instantiating a new session on another computer.

10. A system for establishing a session between a first computer and an application executing on another computer, the system comprising:
    a first computer generating a connection request to establish a session with an application; and
    a load balancing agent executing on the first computer to:
        intercept the connection request,
        determine whether the connection request has a corresponding cached session,
        identify, responsive to determining the connection request does not correspond to a cached session, a second computer executing an instance of the requested application by evaluating a forecasted load calculated by adding a current load value representative of a current load on the second computer to a load value for a distributed computing environment comprising the first computer and the second computer, wherein the load value for the distributed computing environment is based on a number of cached sessions, a reconnection probability and an average session load;

wherein determining the load value for the distributed computing environment further comprises:
identifying an average load on a plurality of sessions executing on the second computer;
identifying a cached session value associated with an amount of cached sessions within the plurality of sessions;
identifying a probability that a cached session reconnects; and
multiplying the average load by the cached session value and the probability;
and connect the first computer to the application executing on the second computer.

11. The system of claim 10, wherein the plurality of sessions further comprises cached sessions and active sessions.

12. The system of claim 10, wherein the load balancing agent measures the average load on the plurality of sessions by evaluating any of the following:
a number of active sessions in the distributed computing environment;
a number of cached sessions in the distributed computing environment;
a number of computers in the distributed computing environment; and
an average number of cached and active sessions hosted by each computer in the distributed computing environment.

13. The system of claim 10, wherein the load balancing agent determines the current load value by evaluating any of the following:
a number of page faults; an amount of memory used by the second computer;
an average amount of time the second computer uses a central processing unit of the second computer; and
a number of sessions hosted by the second computer.

14. The system of claim 10, wherein the load balancing agent executes to:
determine a load on the second server is less than an amount of available second server resources; and
determine the forecasted load is less than an amount of overbooked resources available to the second server.

15. The system of claim 10, wherein the load balancing agent executes to:
determine a load on the second server is less than an amount of available second server resources; and
determine the forecasted load is greater than an amount of overbooked resources available to the second server.

16. The system of claim 10, wherein the load balancing agent executes to:
determine whether the forecasted load is greater than an amount of overbooked resources available to the second server; and
stop, based on a determination that the forecasted load is greater than the amount of overbooked resources, an oldest cached session on the second server.

17. The system of claim 10, wherein the load balancing agent executes to:
determine the connection request corresponds to a cached session;
identify, responsive to determining the connection request corresponds to a cached session, a third computer executing the cached session;
determine whether a current load on the third computer is less than resources available to the third computer; and
connect the first computer to the application executing on the third computer based on a determination the current load is less than the available resources.

18. The system of claim 17, wherein the load balancing agent executes to:
determine the current load is greater than the available resources;
stop execution of the cached session; and
instantiate a new session on another computer.

* * * * *